Figure 1A:
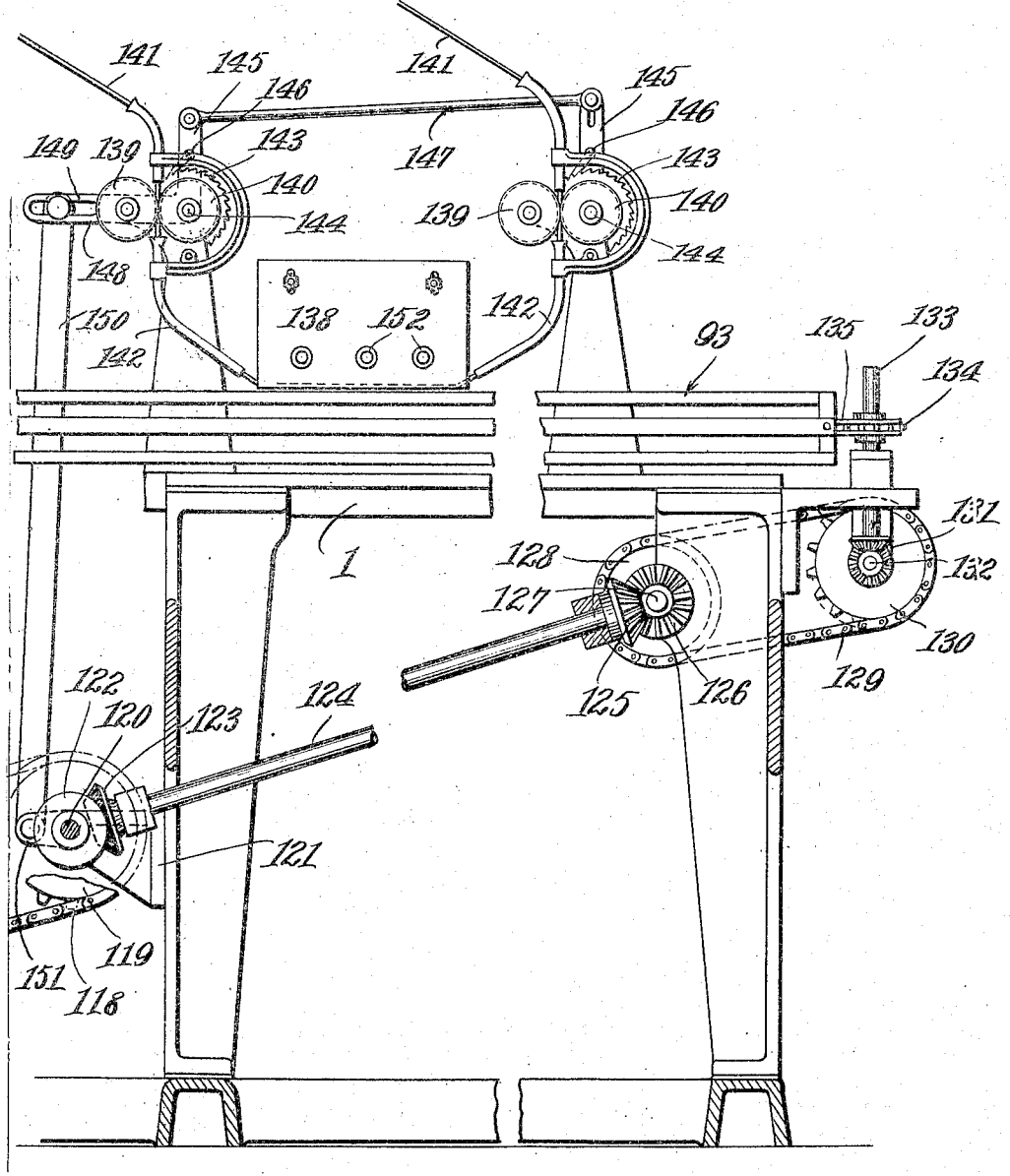

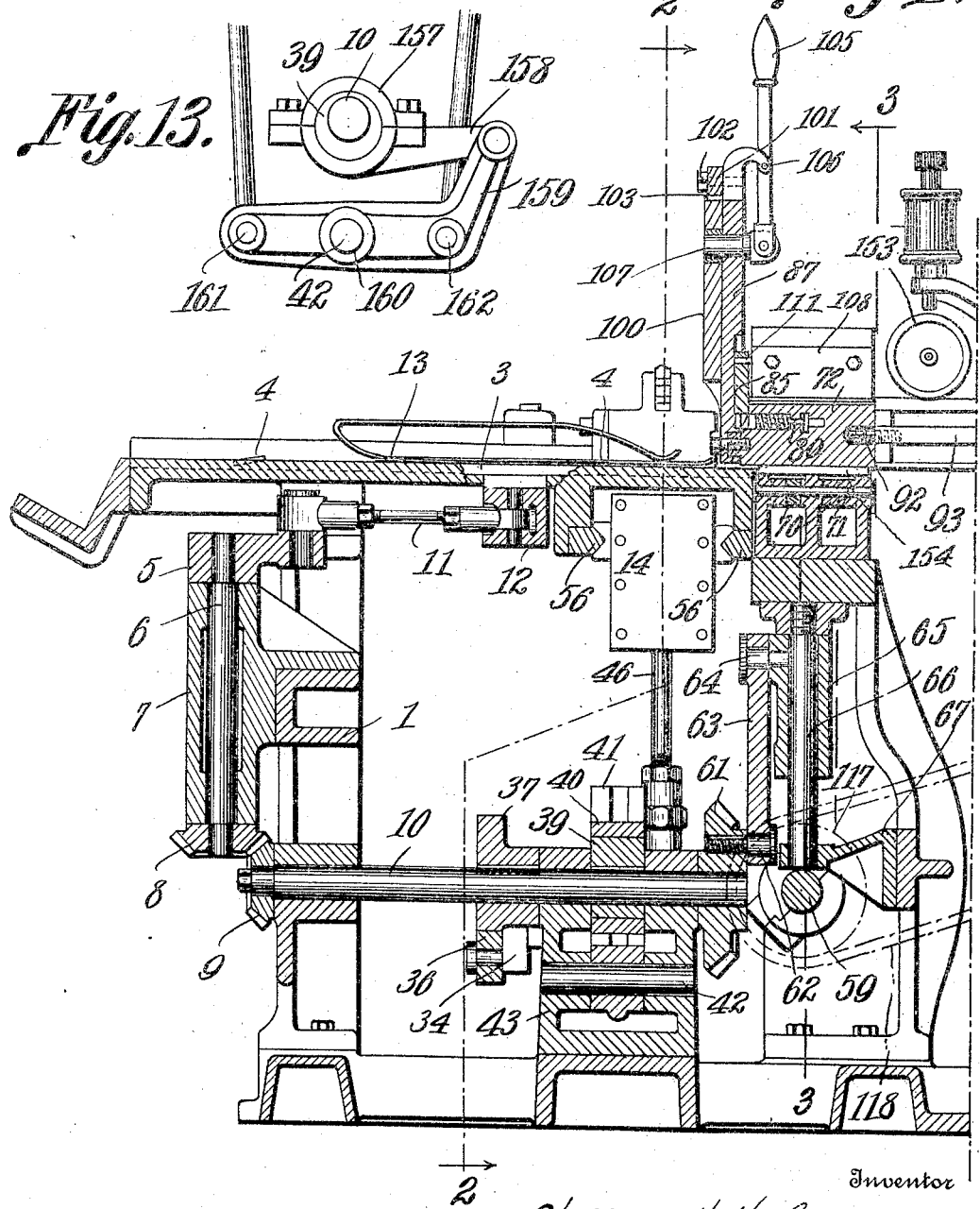

W. H. H. STEVENSON.
CAN BODY FORMING, LOCKING, AND SOLDERING MACHINE.
APPLICATION FILED JUNE 27, 1910.

997,021.

Patented July 4, 1911.

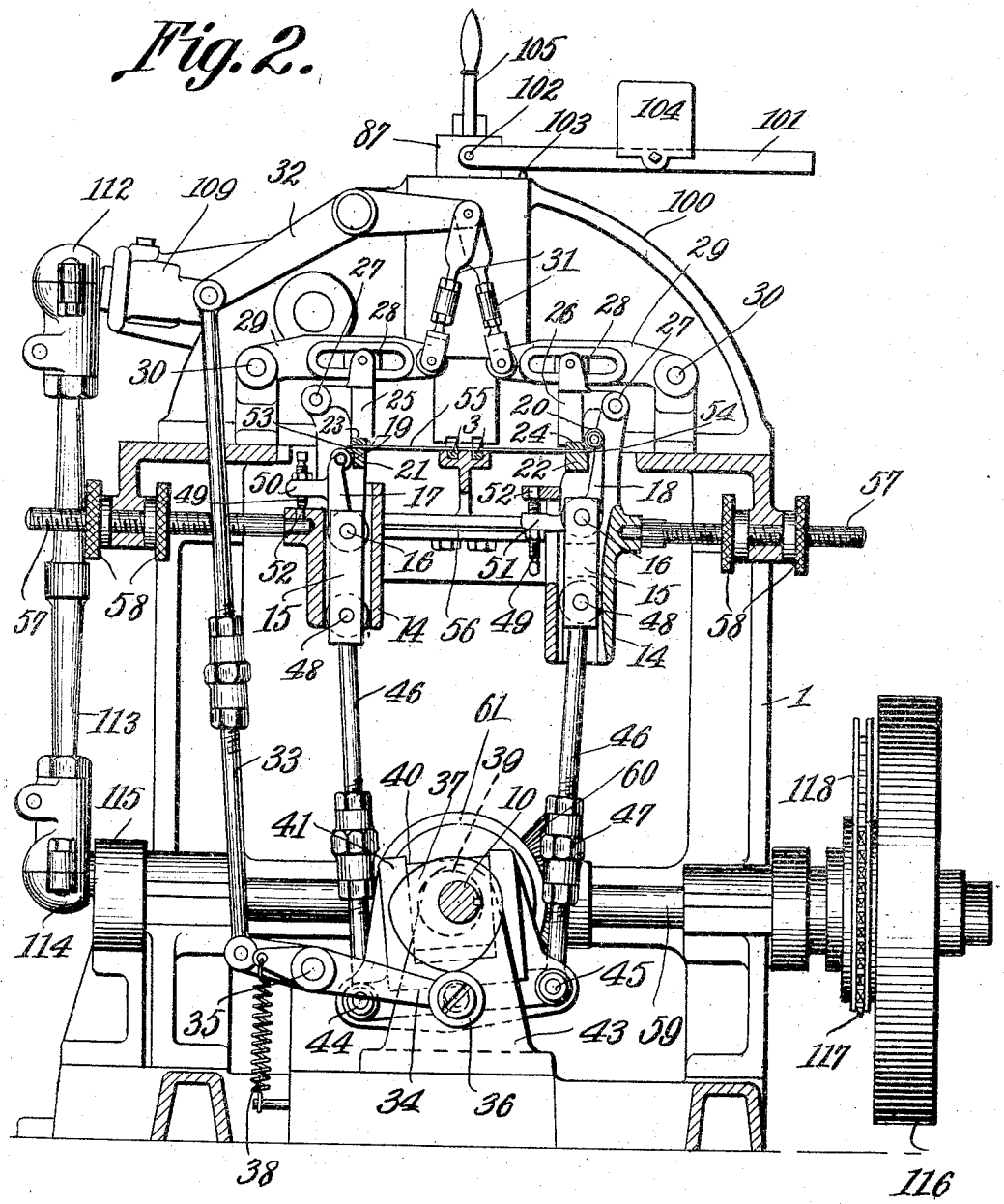

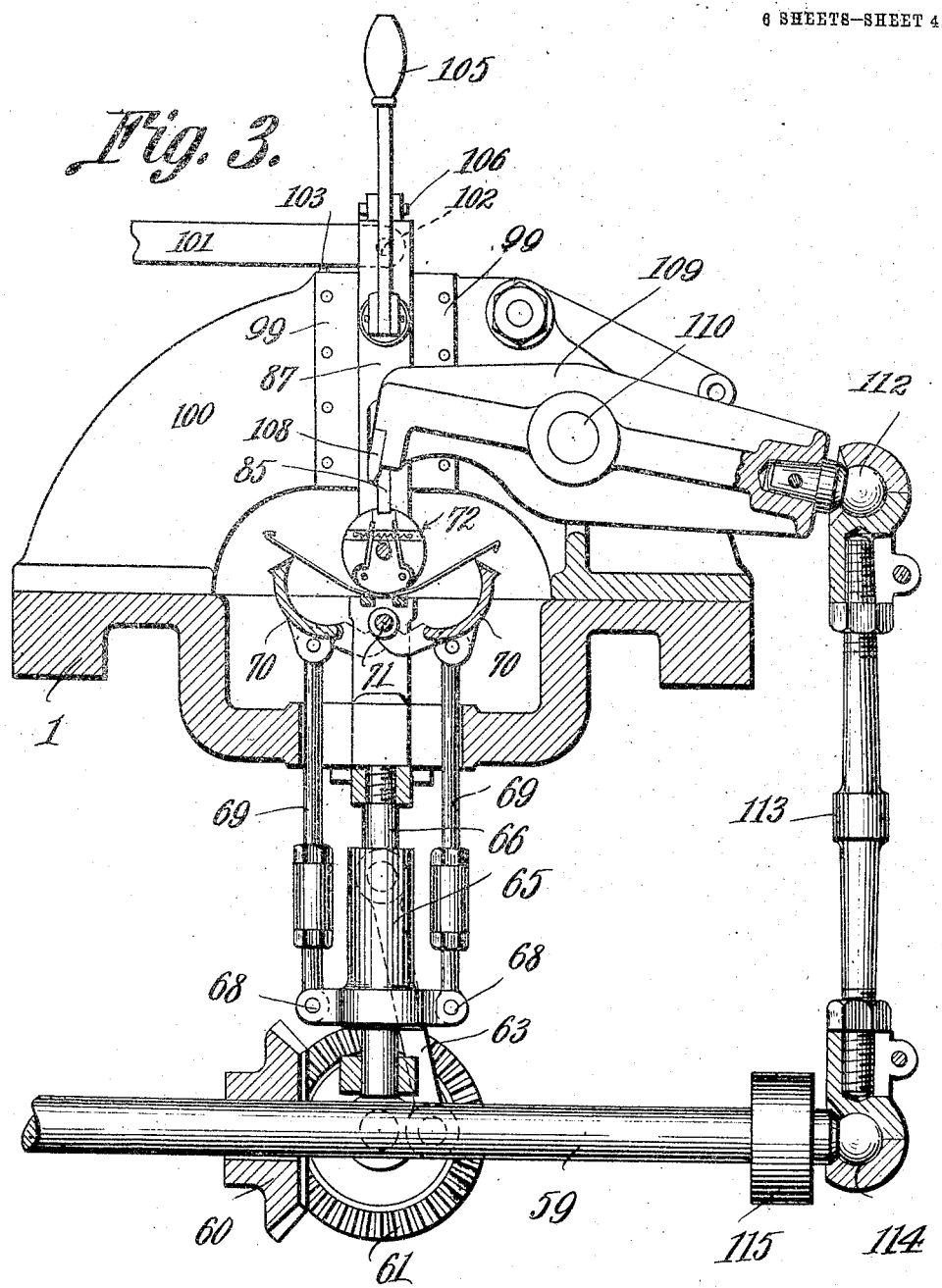

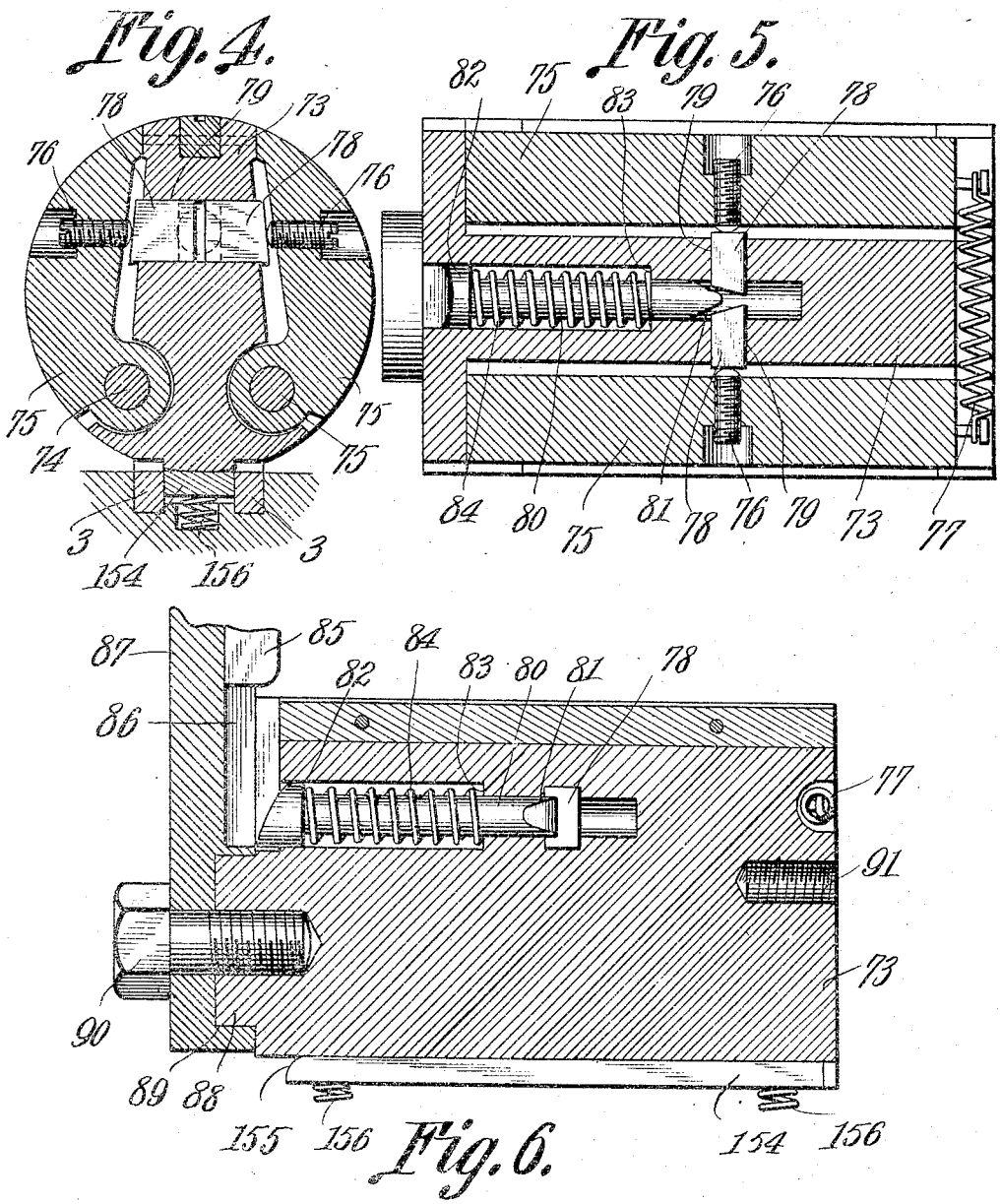

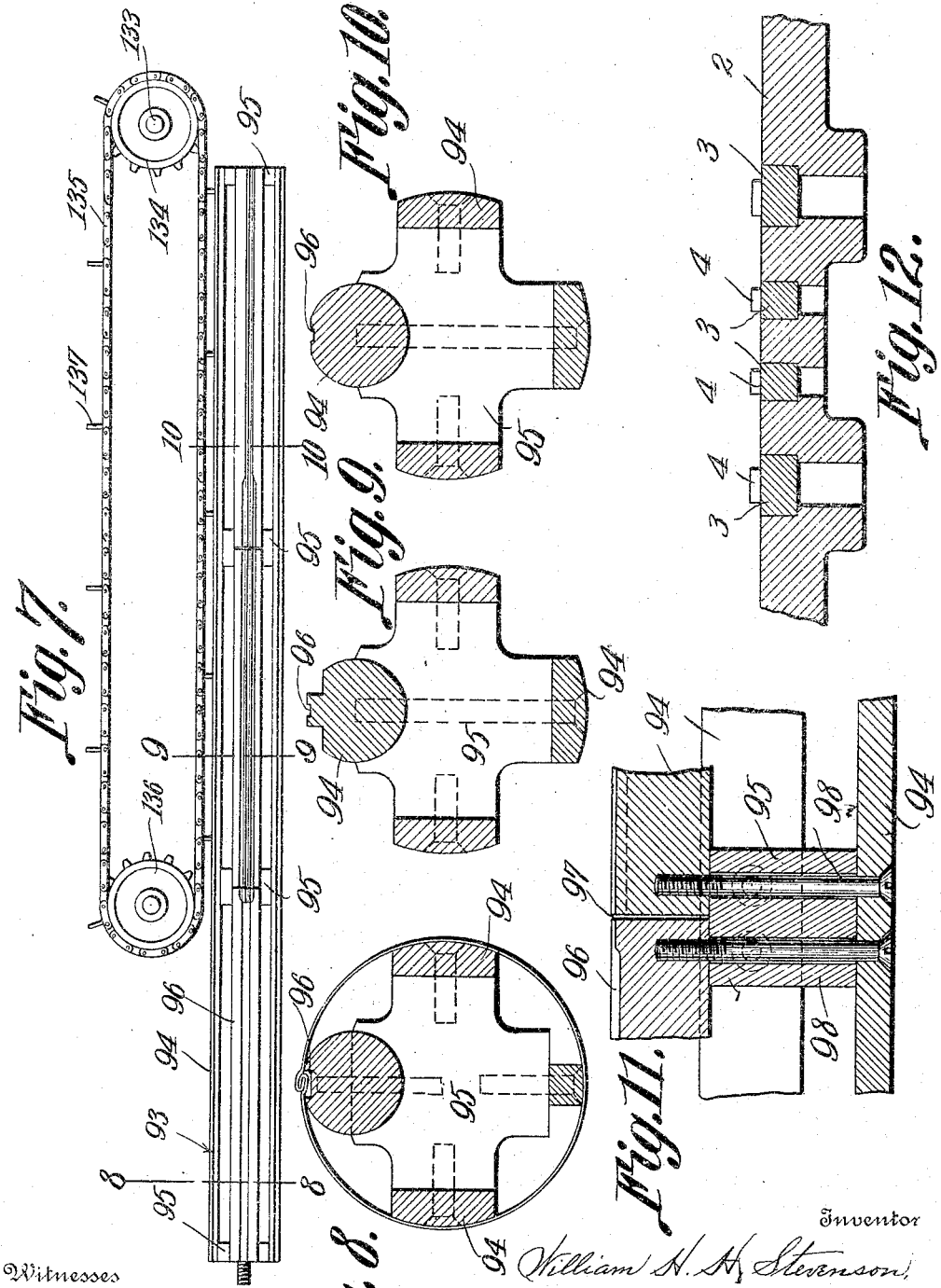

UNITED STATES PATENT OFFICE.

WILLIAM H. H. STEVENSON, OF BALTIMORE, MARYLAND.

CAN-BODY FORMING, LOCKING, AND SOLDERING MACHINE.

997,021.
Specification of Letters Patent. Patented July 4, 1911.

Application filed June 27, 1910. Serial No. 568,995.

*To all whom it may concern:*

Be it known that I, WILLIAM H. H. STEVENSON, a citizen of the United States, residing at Baltimore city, State of Maryland, have invented certain new and useful Improvements in Can-Body Forming, Locking, and Soldering Machines, of which the following is a specification.

This invention relates to can body making machines, and embodies in this present development a machine in which the several operations of forming the can body from blanks of proper size are performed automatically, in proper sequence, and with great rapidity.

The blanks are fed singly, either manually or mechanically, to one end of the machine from whence they are carried to a point on the machine where the opposite edges of each blank are upset, from which are formed the interlocking seam. After this operation, the blank is advanced to a novel device for giving it the desired cylindrical shape. The can blank is here engaged by semi-cylindrical shaped wings which embrace a core of slightly less initial diameter than the diameter of a finished can. By this operation the upset edges of the can blank are brought together, whereupon a hammer descends and during the descent the core is operated upon to expand the can body to the desired diameter so that the interlocking edges are properly positioned before the blow by the hammer is delivered. After this operation the now cylindrically shaped can body is moved over a horn of novel construction for the final operation of soldering the seam, which operation consists of first, treating the seam with acid and then soldering the same. During the subsequent operation of sweating and cooling, the can body is moved continuously along the horn until discharged at the rear of the machine.

With the above objects in view and others that will appear as the description proceeds, the invention is illustrated by the drawings accompanying and forming a part of this specification, in which drawings—

Figure 1 and Fig. 1ª, are views in longitudinal sectional elevation, parts being broken away to better show the invention; Fig. 2, is a section on the line 2—2 of Fig. 1 looking in the direction of the arrow, the more remote parts being omitted; Fig. 3, is a view similar to Fig. 2 on the line 3—3 of Fig. 1; Fig. 4, is a transverse section of the expansible core member; Fig. 5, is a sectional plan view of the same; Fig. 6, is a view in central longitudinal section of the said core member; Fig. 7, is a plan view of the horn member and associated chain conveyer; Fig. 8 is a transverse section of the horn taken on line 8—8; Fig. 9, is a similar section on line 9—9; Fig. 10, is also a transverse section on line 10—10; all of Fig. 7; Fig. 11 is a detail longitudinal section of one of the joints of the horn member; Fig. 12, is a detail transverse section of the table, and slide bars whereby the can blanks are advanced along the table; and Fig. 13, is a view in elevation of a modification of the eccentric device for operating the upsetting members.

Referring to the drawing, 1 indicates the frame of the machine in the bed 2 of which and flush with the top thereof, are arranged a plurality of horizontally extending slide bars 3, provided with forwardly directed spring actuated latch members 4, equally spaced along the length of the bars 3; said latch members protrude above the top of the table and are adapted to engage the can blanks as fed to the machine. The movement of the can blank during the operation previous to the soldering is of course intermittent and this intermittent movement is accomplished by a crank 5, secured to the end of a vertical shaft 6, said shaft being mounted in a bearing sleeve 7, secured to the frame 1. A bevel gear 8 secured to the lower end of shaft 6 meshes with a similar gear 9, secured to the end of a shaft 10, to which reference will be presently made. Journaled to the free end of the crank 5 is one end of a pitman rod 11, the other end being journaled in a block 12, which has secured thereto the bars 3. A spring shoe member 13 is arranged to grip the can blanks against the table top and prevent backward movement of the can blanks during reciprocating movement of the bars 3.

Let it be assumed that the machine is in operation and that an operator is placing can blanks on the table 2 in the path of the latch 4. The rotation of crank 5 will cause the bars 3 to move back and forth, thus carrying the can blanks to the device for upsetting the opposite edges thereof, this device consisting of housings 14, in which are mounted slides 15 and pivoted to the upper end of the slides, as indicated at 16, are levers 17 and 18, each carrying at its upper end a roller 19—20 of sufficient length to engage the entire length of the can blank it is desired to upset.

Secured to the housing 14 and adjacent the rollers 19 and 20 are bars 21 and 22, and disposed above these bars and coacting therewith are other bars 23 and 24, which are secured to levers 25 and 26 respectively, said levers being fulcrumed at 27 to standards rising from the housings 14, and said levers are pivoted at their upper ends to blocks 28, said blocks being slidably mounted in levers 29, having one of their ends pivoted at 30 to a fixed part of the frame and at their free end connected to links 31, the upper ends of which are connected to a lever 32 of the first class.

An adjustable rod 33 connects the lever 32 to the lever 34, which is pivoted to the frame at 35, and provided at its free end with a roller 36, adapted to engage a cam 37 fixed to the countershaft 10, and a spring 38 forces the roller 36 in contact with cam 37, so that when the small side of the cam 37 is presented to the roller 36, the bars 23 and 24 will be elevated above the bars 21 and 22 through the link mechanism just described, whereby a can blank can be fed by the slides 3 between these bars to be gripped thereby at the next rotation of the cam 37, as can be readily seen. At the time the can blank is introduced between these gripping bars, the rolls 19 and 20 are positioned at opposite sides above and below respectively of the projecting edges of the can blank, and the means for upsetting these projecting edges is as follows: Secured to the shaft 10 is an eccentric 39, mounted in a block 40, said block being slidably mounted in a yoke 41, which is pivoted on a pin 42 secured in a bearing block 43, whereby said yoke is oscillated. Pivotally connected to the yoke 41 at 44 and 45 are links 46, provided with adjusting sleeves 47, said links being pivotally connected to the slide blocks 15 at their lower ends, as indicated at 48, thus when the shaft 10 is rotated the eccentric 39 causes the yoke 41 to rock on its pivot and moves the roll 19 in a downwardly direction, while the roll 20 is moved upwardly. This movement brings the rolls into engagement with the edges of the can blank and bends the edges in opposite directions at right angles to the blank until adjustable set screws 49, carried by arms 50 and 51 projecting from the levers 17 and 18 respectively, strike a fixed portion of the frame as indicated at 52, whereupon the relatively vertical movement of the rolls 19 and 20 is changed to an angular movement and the edges of the blank are bent back on the points 53 and 54 formed on the bars 21 and 24 respectively, thus shaping the blank as indicated at 55 in Fig. 2.

The housings 14 are mounted on V blocks 56 and are provided with threaded rods 57 passing through part of the frame 1 and carrying adjusting nuts 58, so that cans of various diameters may be provided for by adjusting the nuts 58, which will adjust the entire upsetting device.

After the upsetting operation is completed the can blank is advanced by the bars 3 for the next operation, viz., that of bending the body and closing the seam, such means being clearly illustrated in Figs. 3, 4, 5 and 6. At 59 is indicated the main drive shaft of the machine, to which is keyed a bevel gear 60 meshing with a bevel gear 61 fixed to the counter shaft 10 and by which said shaft 10 is rotated; said gear 61 constitutes a crank wheel as well and has attached thereto by a pin 62 a pitman 63, which is connected at its upper end by a pin 64 to a sleeve 65 mounted on a rod 66, which is mounted at its upper end in the frame 1, and at its lower end in a bracket 67 projecting therefrom. Pivotally connected to the sleeve 65 at 68 are rods 69 which at their upper ends are attached to wings 70, said wings being hingedly attached at 71 to a fixed portion of the frame.

As the gear 61 is rotated reciprocatory movement is transmitted to the rods 69, and the wings 70 are continuously operated on their pivot 71, carrying the can blank 55 upwardly and embracing an expansible core member 72, which consists of a relatively fixed body part 73, to which are hingedly connected as at 74 a pair of swinging plates 75, each provided with an adjusting screw 76, and held normally closed against the body 73 by a helical tension spring 77. Cam faced slide blocks 78, mounted in ways 79 in the member 73 are adapted to strike the screws 76 and force the members 75 outwardly against the action of the spring 77 for a purpose that will presently appear. A plunger 80, slidably mounted in the body 73 has its inner end beveled at 81 for engaging the cam faces of the blocks 78, the outer end of the plunger being enlarged to form a head 82 between which and a shoulder 83 formed in the member 73, is interposed a compression spring 84. The outer end of the plunger head 82 is cam shaped and adapted to be engaged by a slide 85 mounted in a slot or groove 86, formed in a bar 87. A boss 88 formed on one end of the member 73 is fitted to a bore 89 in the bar 87 and a stud bolt 90 secures the two together. At the opposite end of the member 73 a bore 91 is threaded and into this bore is inserted a stud 92 projecting from one end of a horn 93, said horn being built up of a number of ribs 94, there being four shown in the present instance. Three of these bars or ribs 94 are practically rectangular in cross-section with one edge shaped to conform to the internal diameter of the can body, and are continued without break throughout the length of the horn and are secured to blocks 95 at spaced intervals. The top rail or rib of the horn is made from a round bar and is provided with a groove along which the can seam is moved and over which the soldering is done, and as this bar is in close proximity to the soldering iron, it of course becomes quite heated, therefore to compensate for the consequent lengthening of this bar, which if unprovided for would cause the bar to bend, thereby distorting the can body, it is made in several sections, the adjacent ends of these sections being slightly spaced apart, as shown at 97, Fig. 11, and the holes in the blocks 95 through which screws 98 pass for securing the bars 94 are made slightly larger in diameter than the screws, so that as the round bars 94 lengthen, due to the heating thereof, they may slide on the blocks 95 and therefore do not bend.

The bar 87 is mounted in slides 99, said slides being secured to a yoke 100, which rises from the frame 1. A lever 101 pivoted at 102 to the bar 87 is fulcrumed at 103 on the yoke 100 and carries a counter weight 104 for offsetting the weight of the horn. A lever 105 fulcrumed at 106 has pivotally connected at its lower end a pin 107, passing through the bar 87 and the member 100 thus fixing the position of the horn. Should it be desired to elevate the horn for any purpose, the pin 106 can be withdrawn from its seat in the member 100 and by applying pressure to the lever the horn can be raised.

After the members 70 have operated upon the can blank to give it the cylindrical shape desired, a hammer 108 carried by a lever 109 pivoted at 110, is caused to descend. A pin 111, connects the slide 85 to the hammer 108 and as the hammer descends the slide 85 strikes the plunger 80, forcing it back against the action of the spring 84 until the end 81 engages the blocks 78, which operation causes the plates 75 to swing outwardly thus bringing the overlapping edges of the can blank to the proper position to be operated upon by the hammer.

The end of the lever 109, remote from the hammer 108, is provided with a ball and socket joint 112, the socket member being secured to a pitman rod 113, which is connected at its lower end by a similar ball and socket connection 114 to a crank wheel 115 secured to the main shaft 59. Mounting the hammer horizontally upon the pivoted lever 110, places said hammer in a position to be operated directly from the side of the machine, thereby obviating the necessity of over-head rock-shafts and cams.

At the end of the shaft 59, opposite the crank wheel 115, is a pulley 116 and also a sprocket wheel 117, around which passes a sprocket chain 118 and thence over a sprocket wheel 119, secured to a transverse shaft 120, journaled in brackets 121, secured to the frame 1. Secured to said shaft is a bevel gear 122 in mesh with another bevel gear 123, secured to one end of a shaft 124. The other end of this shaft has secured thereto a bevel gear 125 meshing with a bevel gear 126 on a counter shaft 127 having secured to one end a sprocket wheel 128, and sprocket chain 129 passes around this sprocket wheel and around another sprocket 130.

Secured to a shaft 132, are bevel gears 131 which transmit motion from the shaft through a vertical shaft 133 to a sprocket wheel 134, which carries a chain 135 over an idle sprocket 136, and said chain 135 is provided with spaced fingers 137 and travels parallel with the horn 93, so that as the can blanks are moved the last step, by the bars 3, they are picked up by the fingers 137 and moved to the end of the horn and discharged.

The soldering device in the present instance is designed to feed solder to both ends of the can seam and consists of a similar device located at each end of a soldering iron 138, and each feeding device consists in detail of two grooved rolls 139 and 140, which frictionally engage a thread of solder 141 and feed it to the soldering iron through guiding tubes 142, as the can seam is moved thereunder, the feeding being accomplished by a ratchet wheel 143, made fast to a shaft 144 on which the feed roll 140 is secured. An arm 145 is loosely mounted on the shaft 144 and carries a pawl 146 engaging teeth on the ratchet 143. A link 147 connects the two arms 145 and projecting from one of the arms 145 at right angles thereto and integral therewith is a lever 148, provided with a slot 149, so that a reciprocating link 150 connected thereto, may be adjusted along this slot for the purpose of feeding the desired amount of solder to the iron 138. This link 150 is connected at its lower end to a crank 151, secured to one end of the shaft 120. Heat may be supplied to the soldering iron in any way desired, the means being indicated at 152. The application of solder to both ends of the iron simultaneously, obviates any imperfect seams, as the rear soldering means fills any interstices that are left by the front soldering means.

An acid applying device is indicated at 153, it being of well known construction, a description is therefore deemed unnecessary.

At 154 is shown a block underriding the member 73, having the end from which the blank approaches cut away or beveled as indicated at 155, so the said blank may be readily introduced between said block and the core 73. Springs 156 tend to keep the block seated against the core 73 and thereby prevent displacement of the blank as it is operated on by the wings 70.

Fig. 13 illustrates a modified form of device for reciprocating the rods 46, whereby wear of the eccentric or strap may be taken up and consists of an eccentric strap 157 made in two pieces, and from one of these pieces extends an arm 158, to the free end of which is pivoted one end of a lever 159, said lever is fulcrumed at 160 to the pin 42 and at points 161—162 are pivotally attached the rods 46. When the eccentric is rotated it causes through the arm 158 the lever 159 to rock on its fulcrum 42, and thereby oscillate the rods 46.

The machine thus described is found in practice to be thorough and economical in operation and especially adapted to the purpose for which intended.

I am aware that slight changes and alterations might be resorted to in the form and arrangement of the several parts described, without departing from the spirit and scope of this invention, hence I do not desire to limit myself to the exact construction as herein set forth; but, Having fully described my invention, what I claim as new and desire to secure by Letters Patent is:

1. A machine of the character described comprising a bed, means for moving blanks across said bed, means for upsetting the edges of said blanks, said means comprising clamping mechanism, rollers operative on the ends of said blanks, housings, slides operative in said housings, means connecting said slides and said rollers, a yoke having a sliding block for reciprocating said rollers in opposite directions whereby the edges of the blanks are upset, means for joining said upset edges, means for soldering the same, and means for removing them from the machine.

2. A machine of the character described comprising a bed, means for moving blanks across said bed, means for upsetting the edges of said blanks, said means comprising clamping mechanism including bars, levers pivoted to the frame, said levers having slots therein, blocks slidable in said slots, and pivotally connected to said bars, means for operating said clamping mechanism, rollers operative over the edges of said blanks, means for operating said rollers, means for joining the edges of said blanks, and means for soldering the same.

3. A machine of the character described comprising a frame, a bed, means for feeding blanks to the machine, means for upsetting the edges of said blanks, said means comprising clamping mechanism, rollers operative over the edges of said blanks, guides on said frame, housings slidably mounted on said guides, slides operative in said housings, means connecting said slides and said rollers, a yoke having a sliding block for reciprocating said slides, means for adjusting the positions of said housings on said guides, and means for connecting the upset edges of said blanks.

4. A machine of the character described comprising a frame, a bed, means for feeding blanks to the machine, means for upsetting the edges of said blanks, said means comprising clamping mechanism including bars, levers pivoted to the frame, said levers having slots therein, blocks slidable in said slots and pivotally connected to said bars, means for operating said clamping mechanism, rollers operative over the edges of said blanks, guides on said frame, housings slidably mounted on said guides, means connecting said housings and said bars, slides operative in said housings, means connecting said slides and said rollers, means for reciprocating said slides, means for adjusting the positions of said housings on said guides, and means for connecting the upset edges of said blanks.

5. A machine of the character described comprising a frame, a bed, means for feeding blanks to said machine, means for upsetting the edges of said blanks, said means comprising housings connected to said frame, slides operative in said housings, levers pivoted to said slides, rollers carried by said levers and operative over the edges of said blanks, whereby the latter are upset, means for causing said rollers to travel inwardly, whereby said upset edges are bent at an angle, and means for reciprocating said slides.

In testimony whereof I affix my signature in presence of two witnesses.

WILLIAM H. H. STEVENSON.

Witnesses:
E. WALTON BREWINGTON,
MARY M. MAGRAW.